United States Patent Office 2,929,860
Patented Mar. 22, 1960

2,929,860

PRIMARY CELL

John McCallum, Worthington, John E. Clifford, Columbus, and Donald E. Semones, Hilliards, Ohio, assignors, by mesne assignments, to Remington Arms Company, Inc., Bridgeport, Conn., a corporation of Delaware No Drawing. Application June 2, 1958
Serial No. 738,983

4 Claims. (Cl. 136—154)

This invention relates to primary cells employing lead and lead dioxide electrodes with concentrated phosphoric acid electrolytes.

Presently known primary cells suffer from several limitations. The Le Clanche type, incorporating a zinc anode, a manganese dioxide depolarizer or cathode, and an ammonium chloride electrolyte, for example, suffers polarization during discharge and the cell voltage may decrease by more than one-third during its use. The Le Clanche type also deteriorates when not being used and generally becomes of doubtful reliability after about six months. It operates unsatisfactorily at low temperatures unless special precautions are taken in its construction. It is further limited by the rate at which it can deliver energy from a given volume. Under a 1-ohm load a small Le Clanche cell sometimes delivers less than half the energy it delivers under a 100-ohm load. For high rate applications, therefore, relatively large Le Clanche cells must be used.

On the other hand, the Ruben-type cell, incorporating a zinc anode, a mercuric oxide cathode, and a potassium hydroxide electrolyte, delivers relatively high rates of discharge from a small volume and with less than a 30 percent loss in operating voltage. It also has a good shelf life and is generally reliable after up to a year of storage before use. However, Ruben-type cells do not operate satisfactorily at low temperatures (below 32° F.) and their cost is inherently so great that their usefulness to the general public is thereby limited to very special applications.

Lead-acid batteries comprising lead anodes, lead dioxide cathodes, and sulfuric acid electrolytes with or without additives are well known in the battery art. They are high-rate and low-cost cells whose main disadvantage is large size, and whose main advantage is rechargeability. For a given energy output, the conventional lead-acid cells are five to ten times as large as Le Clanche or Ruben-type cells. In an attempt is made to decrease the size of a lead-acid cell by using more concentrated sulfuric acid, then the electrodes are severely attacked when the cell is not in use, and the cell deteriorates in a few weeks or less depending on acid concentration, purity of materials, structure, etc.

Special primary cells have been made that provide high discharge rate, high voltage, small size, long shelf life, or some other single advantage, but some desirable property is always sacrificed. As an example, the cells described in U.S. Patent 2,472,379, H. E. Lawson, use iron or zinc anodes with lead dioxide cathodes in phosphoric acid electrolytes, but the phosphoric acid electrolytes must also contain hydrochloric acid or hydrobromic acid. These cells are limited to use as "deferred-action-type batteries" because the electrolytes spontaneously attack the anodes at a prohibitive rate and thus limit the shelf life of the cells.

The present invention comprises the discovery that a pure and concentrated phosphoric acid-water mixture with lead anodes and lead dioxide cathodes provides a primary cell with a combination of desirable properties not heretofore obtained in the primary cell art.

A primary cell according to this invention can deliver its energy at a high rate per unit volume, and can deliver substantially all of its capacity at a high rate of discharge, at a high voltage compared with prior cells, and within a close voltage tolerance. It can deliver substantially all of its watt-hour capacity at low temperatures. The cell has a long shelf life, as it does not materially deteriorate on standing at ambient room temperatures nor evolve gases at a prohibitive rate. Thus, a primary cell according to this invention has a combination of desirable properties, yet is made of inexpensive materials, and can be used economically for a wide variety of purposes. Other advantages are apparent from the description herein.

The electrodes in the primary cells of this invention are formed of lead and lead dioxide. The lead electrode constitutes the negative electrode (anode), while the lead dioxide constitutes the depolarizer and is the positive electrode (cathode). It is desirable to electrolytically form the lead and lead dioxide electrodes so as to have maximum porosity and maximum area in contact with the electrolyte. Pure starting materials should be used to assure maximum stability or shelf life. Any of the commercial processes, such as those described by G. W. Vinal in Storage Batteries, John Wiley & Sons, Inc., New York, N. Y., 4th edition, chapter 2 (1955), may be used to form the lead and lead dioxide electrodes. After formation of the electrodes in the desired shape and quantity, the electrodes are dried by customary methods. (See Vinal reference above, p. 41).

The electrolyte comprises phosphoric acid in water. The original acid ingredient may be any form of phosphoric acid, hypo-, meta-, ortho-, or pyro-, or phosphorus pentaoxide. The composition of the aqueous solution depends upon relative concentrations of hydrogen, phosphorus, and oxygen atoms, regardless of the original form of the acid placed in the water. For convenience herein, concentrations are specified as weight percentages of ortho-phosphoric acid, $H_3PO_4$, in water. It is understood, however, that any convenient starting materials may be used to obtain the specified concentrations. In a small cell, it is desirable to use highly concentrated acids (at least about 90 weight percent $H_3PO_4$); but, to obtain low-temperature operation, it is desirable to use less than 90 weight percent $H_3PO_4$. 85 weight percent $H_3PO_4$ gives excellent cell performance at 32° F. Initial acid concentrations between 65 and 85 weight percent $H_3PO_4$ are preferred for extremely low temperatures.

It has been discovered that primary cells comprising Pb anodes, $H_3PO_4+H_2O$ electrolytes, and $PbO_2$ cathodes according to this invention provide a unique combination of advantages, as small size with high watt-hour capacity per cubic inch, high discharge rate in watts per cubic inch, high voltage per cell, substantially constant closed circuit voltage, low-temperature operation, long shelf life, and low gassing rate.

To illustrate these advantages, several cells of "AA" size (about 0.44 cubic inch) were constructed, using Pb and $PbO_2$ electrodes from commercial dry-charged storage batteries but with 85 weight percent $H_3PO_4$ electrolyte. These cells were compared with commercial Le Clanche-type and Ruben-type cells of equivalent size under substantially the same testing conditions. The lead cells had the electrodes wrapped with 0.005-inch thick linen separators and only enough 85 percent $H_3PO_4$ electrolyte was added to fill the pores of the electrodes and separators. Thus the electrolyte was held in place by capillarity and would not spill out if the cells were inverted. The tests show that the cells operate effectively with a small amount of electrolyte and have high watt-hour capacity per cubic inch. Typical results were as follows:

(a) High capacity, watt hours per cubic inch, for small size:

| Cell | Average Unit Power, Watts/in.³ | Total Unit Energy, Watt-Hours/in.³ |
|---|---|---|
| Improved Primary Cell, Pb/85% H₃PO₄/PbO₂ | 0.08 | 1.9 |
| Commercial Le Clanche Cell, Zn/NH₄Cl/MnO₂ | 0.06 | 1.4 |
| Commercial Lead Acid Cell, Pb/1.26 Sp.G. H₂SO₄ | 0.08 | 1.1 |

(b) High voltage at high rate of discharge:

| Cell | Average Unit Power, Watts/in.³ | Average Closed Circuit Voltage |
|---|---|---|
| Improved Primary Cell, Pb/85% H₃PO₄/PbO₂ | 0.08 | 1.74 |
| Commercial Le Clanche Cell, Zn/NH₄Cl/MnO₂ | 0.06 | 1.23 |
| Commercial Ruben Cell, Zn/KOH/HgO | 0.08 | 1.20 |

(c) Close voltage tolerance:

| Cell | Average Unit Power, Watts/in.³ | Initial Closed Circuit Voltage | Final Closed Circuit Voltage | Total Unit Energy, Watt-hours/in.³ | Average Closed Circuit Voltage |
|---|---|---|---|---|---|
| Improved Primary Cell, Pb/85% H₃PO₄/PbO₂ | 0.048 | 1.92 | 1.80 | 2.0 | 1.86±3% |
| Commercial Le Clanche Cell, Zn/NH₄Cl/MnO₂ | 0.027 | 1.60 | 1.00 | 2.1 | 1.23±27% |
| Commercial Ruben Cell, Zn/KOH/HgO | 0.047 | 1.32 | 1.05 | 6.2 | 1.20±10% |

(d) Low temperature operation:

| Cell | Average Unit Power, Watts/in.³ | Total Unit Energy, Watt-hours/in.³ at 32° F. | Average Closed Circuit Voltage at 32° F. |
|---|---|---|---|
| Improved Primary Cell, Pb/85% H₃PO₄/PbO₂ | 0.048 | 1.9 | 1.75 |
| Commercial Le Clanche Cell, Zn/NH₄Cl/MnO₂ | 0.039 | 0.73 | 1.14 |
| Commercial Ruben Cell, Zn/KOH/HgO | 0.048 | 1.4 | 1.15 |

(e) To illustrate the relative stability of the Pb and PbO₂ electrodes in the phosphoric acid electrolyte, identical electrodes were taken from a commercial dry charged lead acid storage battery. One set of electrodes was completely covered with 85 weight percent H₃PO₄. Another set of identical electrodes was covered with H₂SO₄ of specific gravity equal to 1.26 g./cm.³. Evolved gases were collected over a period of weeks and results were as follows:

| Electrode | Acid | Gassing rate, cm.³ gas/day/in.² of Electrode |
|---|---|---|
| Pb | 85% H₃PO₄ | 0.095 |
| Pb | H₂SO₄, Sp. G.=1.26 | 2.66 |
| PbO₂ | 85% H₃PO₄ | 0.005 |
| PbO₂ | H₂SO₄, Sp. G.=1.26 | 0.213 |

(f) To illustrate the low cost of our improved lead primary cells, the "AA" size cells described above used about 4 cents worth of materials in finished and assembled form. A Le Clanche type "AA" size cell uses about 3½ cents worth of materials in finished and assembled form. A Ruben type "AA" size cell uses about 25 cents worth of materials in finished and assembled form. Converting these material costs to watt-hours per dollar with the watt-hours per cubic inch from example (c), we obtain the following comparative costs:

| Cell | Average Unit Power, Watts/in.³ | Total Unit Energy, Watt-hours per "AA" Size Cell | Unit Energy Cost. Watt-hours/Dollar of Materials for "AA" Size Cell |
|---|---|---|---|
| Improved Primary Cell, Pb/85% H₃PO₄/PbO₂ | 0.048 | .87 | 22 |
| Commercial Le Clanche Cell, Zn/NH₄Cl/MnO₂ | 0.027 | .91 | 26 |
| Commercial Ruben Cell, Zn/KOH/HgO | 0.047 | 2.7 | 11 |

This comparatively good position for our improved primary cell in terms of watt-hours per dollar of materials used is even more advantageous when the high voltage is considered. Thus 3 of the new cells can replace 4 Le Clanche or 4 Ruben cells for a given voltage application and this entails further obvious economic advantages.

What is claimed is:

1. A primary cell comprising an anode consisting essentially of lead, a cathode consisting essentially of lead dioxide, and an electrolyte consisting essentially of an aqueous solution of at least about 65 weight percent ortho-phosphoric acid.

2. A primary cell comprising an anode consisting essentially of lead, a cathode consisting essentially of lead dioxide, and an electrolyte consisting essentially of from about 65 to 85 weight percent ortho-phosphoric acid, balance water.

3. A primary cell comprising an anode consisting essentially of lead, a cathode consisting essentially of lead dioxide, and an electrolyte consisting essentially of about 85 weight percent ortho-phosphoric acid, balance water.

4. A primary cell comprising an anode consisting essentially of lead, a cathode consisting essentially of lead dioxide, and an electrolyte consisting essentially of at last about 90 weight percent of ortho-phosphoric acid, balance water.

References Cited in the file of this patent
UNITED STATES PATENTS

| | | |
|---|---|---|
| 664,023 | Marino | Dec. 18, 1900 |
| 2,472,379 | Lawson | June 7, 1949 |